United States Patent Office 3,517,733
Patented June 30, 1970

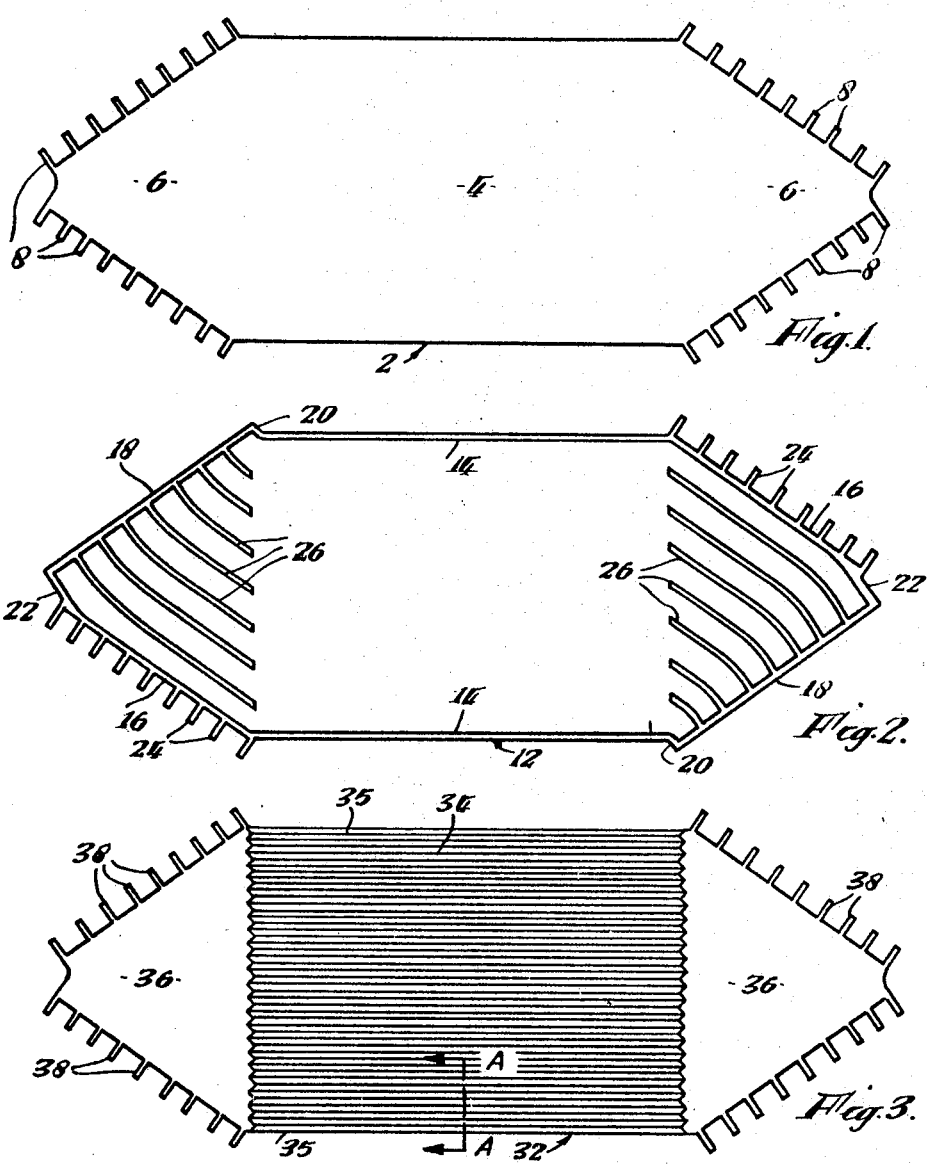

3,517,733
HEAT EXCHANGERS
Ronald Vivian Tasker, Newcastle-upon-Tyne, and Raymond Leslie Holmes, Cleadon, Sunderland, England, assignors to Clarke, Chapman & Co. Limited, Gateshead, Durham, England, a company of Great Britain and Northern Ireland
Continuation of application Ser. No. 699,257, Jan. 19, 1968. This application Aug. 20, 1969, Ser. No. 852,982
Claims priority, application Great Britain, Jan. 25, 1967, 3,759/67
Int. Cl. F28f 3/00
U.S. Cl. 165—166                                          23 Claims

ABSTRACT OF THE DISCLOSURE

The specification discloses a plate-type heat exchanger for fluid flows in which a heat exchange stack can be built up from different forms of relatively thin planar members. Two of the forms are solid plates, one corrugated and the other flat, and these are stacked in alternation to each other to form a series of fluid passages between each abutting pair of corrugated and flat faces. Spacer members between each pair of plates have a closed profile providing a peripheral seal between the plates over most of their extent. The plates have symmetrical profiles but the spacer members are asymmetrical at two mutually remote end regions and inlet and outlet openings are thereby provided for the fluid passages between the plates. By reversing each successive spacer member, their asymmetrical location disposes alternate inlet and outlet openings at alternate peripheral positions where manifolds extending transversely to the members may conduct the two fluids to and from the heat exchange passages. Such manifolds can be formed integrally with the spacer members so that they are built up with the assembly of the stack. Each corrugated plate has flat end regions and elements integral with the spacer members extend inwardly over these regions to maintain the plates flat and to guide the flow to the passages formed by the corrugations.

---

Figure 4:
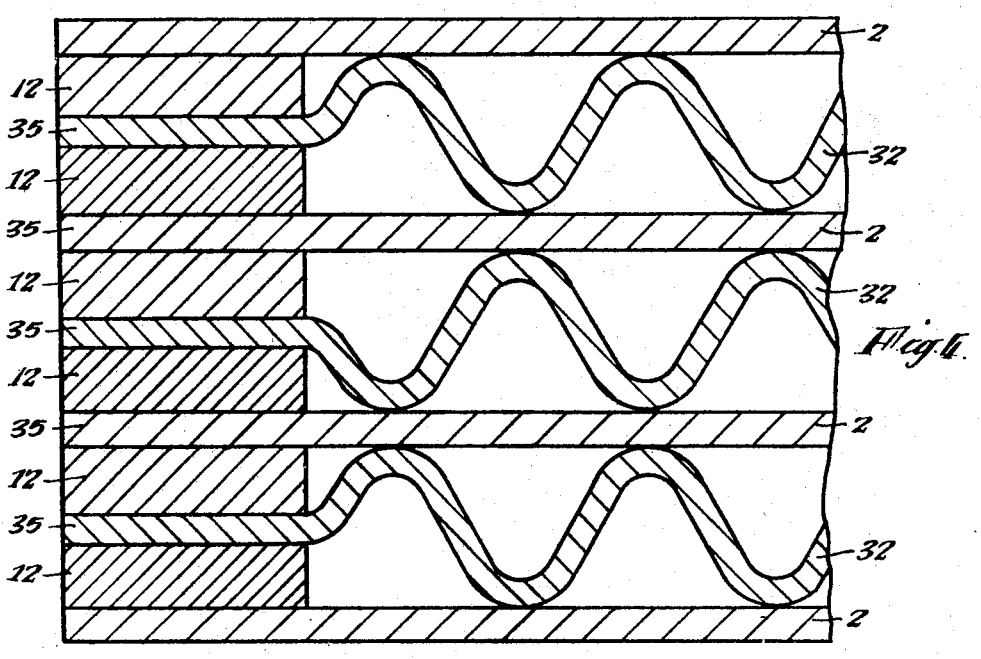

This application is a continuation of application Ser. No. 699,257, filed Jan. 19, 1968, now abandoned.

This invention relates to means for effecting an exchange of heat between two flows of fluid and is particularly concerned with heat exchangers in which a series of plates are placed adjacent each other to form a stack, spaces between successive plates being available to form conduits for the fluids.

In the construction of such assemblies, the plates themselves may be relatively fragile, particularly if the spacing of the conduits is to be maintained by relatively thin elements so that a useful internal volume can be obtained with relatively compact overall dimensions. They are therefore easily damaged before they are secured together as an assembly and the manufacture of heat exchanger stacks using large plates is particularly difficult. The location of such spacer elements before the assembly is secured together also presents problems.

According to the invention, there is provided a heat exchange element for heat transfer between two fluid flows comprising a series of superimposed plates and an abutting spacer member located between each successive pair of plates to enclose a fluid conduit between said pair of plates, apertures or recesses being provided in the plates at intervals about their peripheries to define inlet and outlet openings for the two fluids, the spacer members having closed profiles and portions of said profile of each succeeding spacer member being located outwardly of said apertures or recesses at an alternate plurality of said openings to define inlet and outlet ports permitting the respective fluids to flow through the conduits between alternate pairs of the succeeding plates in the series.

By having such an arrangement, the spacer members, which will usually have a very high void to solid ratio, are relatively robust since they have a closed profile and are therefore less liable to damage before assembly. In addition, by virtue of their continuous profile they are able to offer support for the plates at said apertures or recesses to maintain the spacing between the plates at these regions. Such a continuous profile can be similar to that of the plates of the assembly so that the stacking, locating and holding operations that must be performed before the elements of a heat exchange assembly are secured together (e.g. by brazing) are simplified.

Advantageously, the primary heat transfer surface area in an arrangement according to the invention is increased by providing alternate ones of said series of plates with corrugations extending along the direction of fluid flow and each engaging at its opposite faces with a pair of adjacent flat plates to define a series of substantially triangular, and preferably equilateral, section passages.

It is convenient to locate the corrugations in an intermediate region between mutually remote end regions of the plates at which said apertures or recesses are arranged. In this case, the apertures or recesses in said end regions can be spaced from the corrugations and each spacer member may then include elements extending inwardly from said apertures towards the corrugations to act as internal spacing and fluid flow guidance means. The support that such elements can offer allows the thickness of the plates to be reduced and therefore increases the efficiency of heat transfer while they can also improved the operation of the device by promoting an even fluid flow distribution over the width of the plates.

In a preferred construction according to the invention, said end regions of each plate are symmetrical about a longitudinal axis of the plate while each spacer member has respective portions in each of its associated end regions which are registrable with the inner periphery of the apertures or recesses on one side of the axis of symmetry and which are locatable outwardly of the apertures or recesses on the other side of said axis. By this means, it can be arranged that reversal of the spacer member will register it with an alternative plurality of openings of the two sets of inlets and outlets at opposite ends of the plates so that a single spacer member profile can be used throughout a heat exchanger stack.

Figure 5:
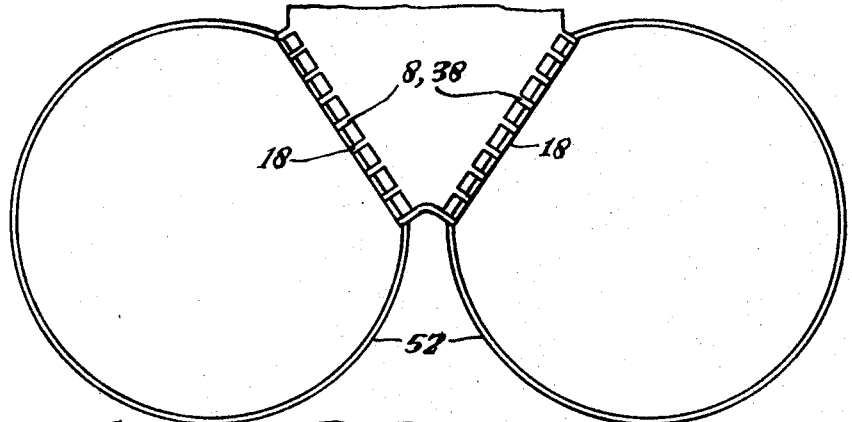
Figure 6:
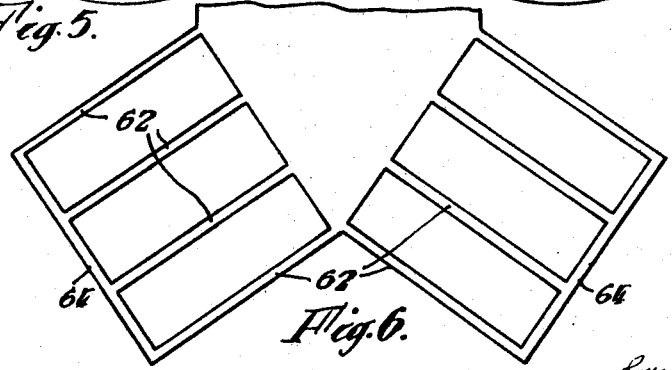

One form of the invention will now be more particularly described, with reference to the drawings, wherein:

FIGS. 1 to 3 illustrate, respectively, a flat plate, a spacer member and a corrugated plate for a heat exchange element according to the invention, FIG. 4 is an enlarged part cross-section of an assembly of elements corresponding to the view at the line A—A in FIG. 3, FIG. 5 shows a part end view heat exchanger stack according to the invention with manifolds for the fluid flows, and FIG. 6 is illustrative of a modified arrangement accoridng to the invention.

Referring to FIG. 1 of the drawings, flat plate 2 of uniform thickness comprises a main intermediate rectangular region 4 and a pair of opposite end regions 6 having an equilateral triangular form. At each free edge of the end regions 6 is a series of equispaced arms 8 projecting perpendicular to said edge. The plate is therefore symmetrical about a longitudinal axis extending through the mutually remote apices of the end regions 6.

Spacer member 12 in FIG. 2 is a uniform thickness flat frame of continuous peripheral form comprising a pair of parallel intermediate strips 14 and, at opposite ends thereof, pairs of obliquely directed strips 16, 18, the corresponding ones of these two differently formed strips being located on opposite sides of the frame at the respective ends. The strips 16 continue directly from adjacent ends of the strip 14 while lateral extension elements 20, 22 at the ends of the strips 18 form continuations between these latter strips and the strips 14, 16 respectively. A series of equispaced arms 24 project perpendicularly from the outer periphery of each strip 16 while from the inner periphery of each strip 18 a similarly spaced series of inner arms 26 extends to a line joining the adjacent ends of the two strips 14. The arms 26 are perpendicular to the strips 18 at their junction therewith but are curved intermediate their length so that their free ends run parallel to the adjacent strips 16.

Corrugated member 32 in FIG. 3 is of uniform thickness and comprises a main intermediate rectangular region 34 occupied by a series of longitudinally directed corrugations the peaks of which project equidistantly to opposite sides of the plane of flat side edge regions 35. The member also includes a pair of opposite end regions 36 having an equilateral triangular form, said regions being flat and co-planar with the edge regions 35. At each free edge of the end regions 36 is a series of equispaced arms 38 projecting perpendicular to their edge and the plate is symmetrical about a longitudinal axis extending through the mutually remote apices of the end regions 36.

The peripheral profiles of the members 2, 32 are identical. In the spacer member 12, the intermediate frame strips 14 can be superimposed directly upon the side edge regions 35 of the member 32, and the frame strips 16 and their arms 24 then have their outer peripheries coincident with each adjacent outer edge of the end regions 6, 36 and the associated arms 8, 38 of said regions. At the remaining two sides of the hexagonal profile, the arms 8, 38 are coincident with the root portions of the arms 26 and each frame strip 18 is spaced away from the portions of the member peripheries from which the arms 8, 38 extend, the strip outer periphery of each strip 18 instead being coincident with the edges of the free ends of the arms 8, 38.

The heat exchange element is built up by stacking the members 2, 32 in alternation, a spacer member 12 being placed between each successive pair of members. Considering an initial assembly of one each of the three different members, the effect will be that an internal space is formed between the members 2, 32 and is closed from the exterior on the sides of the assembly containing the spacer frame strips 14 and 16 where the outer peripheries of all three members are coincident. If desired, the seal at these edges can be secured by such means as welding or brazing. At the two mutually remote sides containing the frame strips 18, a series of apertures are formed between the coincident arms 8, 26, 38 since the strips 18 are spaced outwardly from the adjacent edges of the plate end regions 6, 36. Fluid can therefore flow into the assembly at one side of one end region to the corresponding apertures at the other side of the other end region, the flow between these two positions passing through the longitudinal corrugations by way of the guide channels that the inner arms 26 define at the end regions of the plates.

To complete the heat exchanger element module, a second spacer member is placed on the free face of the corrugated member in a reversed position, so that its strips 16, 18 are on the sides of the strips 18, 16 respectively of the first spacer member, and a second flat plate member 2 is located on this second spacer member. A second internal space is thereby formed that is divided from the first by the member 32 between the two spacer members and that has its inlet and outlet apertures on those mutually remote sides of the end regions which are sealed from the first internal space. In other words, the strips 16, 18 of the second spacer member overlie the strips 18, 16, respectively of the first spacer member. It will, of course, be appreciated that with this arrangement the second spacer member similarly seals off the second internal space at the two end region edges where the communicating apertures to the first internal space are formed.

The assembly thereby presents at its periphery separate faces for the entry and exit of two fluid flows between which heat exchange can occur through the corrugated member 32. A stack can be built up by repeating the assembly module, the second flat member 2 of each set serving as the first flat member of the succeeding set of members; the fluids can then be led to and from the required faces of the stack by manifolds to these faces. FIG. 5 illustrates such manifolds at 52. They may be conduit-form members extending along the stack transversely to the planes of the plates and sealingly secured at said faces of the stack or they can be formed by integral enclosing strips, each of identical form, extending from the sides of the end regions of the plates and spacer members, which are superimposed as the stack is built up to form the continuous passages of the manifolds.

FIG. 4 illustrates the arrangement of a stack having a series of sets of members. A feature to be noticed here is that succeeding corrugated members are reversed relative to each other so that their corrugations are 180° out of phase. If it is remembered that one of the fluids will flow on the underside of each corrugated member and the second fluid on the upper side of each such member, it will be appreciated from the drawing that the channel formed by each corrugation is surrounded on all sides by channels carrying the other of the two fluids. The shaping of the corrugations moreover is such that these channels approximate in cross-section to equilateral triangles whereby the effective path lengths for heat transfer are kept relatively short.

This configuration is of particular advantage when heat transfer operations are to be performed using a liquid metal for at least one of the fluids, such as may occur in known nuclear power generation units, since with liquid metals it is necessary to employ primary surfaces for heat transfer, the action of secondary heat transfer surfaces such as fins being very inefficient.

FIG. 6 is illustrative of an assembly according to the invention in which, in place of the recesses between the arms 8, 38 of the plates of the first-described example, there are now apertures in the individual plates at the inlet and outlet openings. These apertures replace the manifolds of the example shown in FIG. 5 and comprise side strips 62 extending from the outer edges of the solid triangular end regions of the plates to adjoining terminal strip 64 of each plate so that the space between each pair of strips 62 is enclosed.

Analogously to the first-described example, the apertures are symmetrically disposed in the end regions of the plates. In the spacer members, the arms 24 are modified so that they now extend coincidentally with the strips 62 and are also provided with terminal joining strips coincident with the strips 64. At one side at each end of a spacer member the inner ends of the side strips corresponding to the arms 24 are joined by a further strip sealing against the edges of the plates, analogously to the strips 16 indicated in FIG. 2, while on the other side there is no such joining strip so that the fluid flow can pass to and from the spaces between adjacent pairs of plates; here the side strips function analogously to the strips 26 of FIG. 2 and are similarly extended into the end regions of the plates to function as spacing and flow guidance means. If these functions are not required, however, the intermediate side strips can be omitted from the plates and spacer members so that there is a single aperture or manifold at each end face of the stack.

What we claim and desire to protect by Letters Patent is:

1. A heat exchanger comprising, in combination, a series of coextensive plate elements each having a central portion and two spaced end portions extending from opposite sides of said central portion, apertures or recesses being provided over at least part of the peripheries of the plate elements in said end portions, said plate elements being juxtaposed and a planar frame-shaped spacer element being interposed between each successive pair of plate elements to abut said elements and enclose a fluid conduit therebetween, the spacer elements having closed profiles substantially co-extensive with the plate elements but portions of said profile of each spacer element being located outwardly of a plurality of said apertures or recesses of the plate elements to define therewith spaced inlet and outlet ports to the fluid conduit enclosed by the plate and spacer elements, seal means between each spacer element and its abutting plate elements at the peripheral margin thereof extending from said ports, alternate spacer elements defining, with said apertures or recesses, inlet and outlet ports at staggered peripheral locations to permit respective ones of two heat exchange fluids to flow through the conduits formed between alternate pairs of the succeeding plate elements.

2. A heat exchanger according to claim 1, wherein alternate ones of said plate elements have corrugations extending along the direction of fluid flow, the remaining plates being planar at least over the regions coincident with said corrugations.

3. A heat exchanger according to claim 2, wherein said corrugated and planar regions define a series of passages each having the cross-sectional form of a substantially equilateral triangle.

4. A heat exchanger according to claim 2, wherein the corrugations in each corrugated plate element are located in said central portion and said apertures or recesses being located in said end portions so that they are spaced from the corrugations, each spacer element including inner elements extending from said apertures or recesses toward the corrugations to act as internal spacing and flow guidance means.

5. A heat exchanger according to claim 4, wherein said inner elements are arranged to deflect the flow angularly intermediate their length.

6. A heat exchanger according to claim 1, wherein a series of arms project perpendicularly from the edges of the plate elements to define lateral boundaries of said apertures or recesses.

7. A heat exchanger according to claim 5, wherein the end portions of the plate elements are of substantially equilateral triangular form and wherein a series of arms project perpendicularly from the edges of the plate elements to define lateral boundaries of said apertures or recesses, said spacer elements comprising first and second portions, the said first portion extending from the periphery of the repective spacer element coaxial with said arms of the plate elements at said apertures or recesses and continuing to the respective second portions which are directed parallel to the other outer edge of the associated triangular end portion of the spacer element.

8. A heat exchanger according to claim 1, wherein end portions at mutually remote locations on each plate element are provided with said apertures or recesses, said end portions each being symmetrical about a longitudinal axis of the plate element, each spacer element having respective sections in each of its associated end portions of which one part is registrable with the inner periphery of the apertures or recesses on one side of the axis of symmetry and the other part is located outwardly of the apertures or receses at the other side of said axis.

9. A heat exchanger according to claim 8, wherein each spacer element has corresponding ones of said parts located on opposite sides of said axis at opposite ends of the spacer element, successive spacer elements, having profiles of identical but inverted form.

10. A heat exchanger according to claim 1, wherein peripheral portions of the plate elements and spacer elements are placed in coincidence and are sealingly joined to define inlet and outlet manifolds.

11. A heat exchanger according to claim 1, said seal means being a weld seal.

12. A heat exchanger according to claim 1, said sealing means being a brazed weld seal.

13. A heat exchanger comprising in combination at least two elongated coextensive plate elements each having a central portion and two spaced end portions extending from opposite sides of the respective central portion, said plate elements being juxtaposed and spaced from one another by a predetermined distance so as to define between themselves an elongated gap; dividing means subdividing said gap in the region of said central portions of respective juxaposed plate elements into a plurality of fluid conduits extending longitudinally of said plate elements intermediate said end portions; at least one planar frame-shaped spacer element substantially coextensive with and interposed between said plate elements, said spacer elements having a thickness at least substantially equal to said predetermined distance and having peripheral edge portions in abutting engagement with respective corresponding marginal edge portions of said plate elements; and first and second aperture means communicating with said elongated gap in the region of the respective end portions of said plate elements and operative for admittance and evacuation of heat-exchange fluid, respectively.

14. A heat exchanger as defined in claim 13, said first and second aperture means being respectively located at opposite sides of a longitudinal plane of symmetry of said gap.

15. A heat exchanger as defined in claim 13, further comprising a plurality of first and a plurality of coextensive second arms respectively spaced along and extending outwardly from the peripheries of the respective end portions of said plate elements, coplanar therewith; and a plurality of third arms coextensive with said first and second arms and including two groups of third arms respectively extending outwardly from the end portion of said spacer element at opposite sides of a longitudinal plane of symmetry thereof.

16. A heat exchanger as defined in claim 15, said spacer element further comprising at the respective end portions thereof a first and a second group of divider strips extending inwardly from end portions of said spacer element in direction longitudinally of said gap and towards said fluid conduits from said first and second aperture means, respectively.

17. A heat exchanger as defined in claim 16, wherein said divider strips of one of said groups are curved inwardly in one direction transversely to the elongation of said gap, and wherein said divider strips of the other of said groups are also curved inwardly and transversely to the elongation of said gap but in another direction opposite said one direction.

18. A heat exchanger as defined in claim 14, wherein said end portions are of at least substantially triangular outline and have respective apices facing away from one another.

19. A heat exchanger as defined in claim 13, and further comprising seal means sealingly connecting said marginal edge portions of said plate element and said peripheral edge portions of said spacer element.

20. A heat exchanger as defined in claim 1, wherein said fluid conduits each have a cross-sectional configuration resembling an equilateral triangle.

21. A heat exchanger as defined in claim 15, wherein said arms extend at least substantially normal to the respectively associated periphery.

22. A heat exchanger as defined in claim 15, wherein said arms of each plurality of arms are equidistantly spaced from one another.

23. A heat exchanger as defined in claim 13, and comprising a further plate element similar to the first mentioned plate element and juxtaposed with one of the same at a side of the latter remote from the other of said first mentioned plate elements, said further plate element being inverted with reference to said other plate element and said one plate element.

References Cited

UNITED STATES PATENTS

| 2,321,110 | 6/1943 | Shipman | 165—166 X |
| 2,576,213 | 11/1951 | Chausson | 165—166 |
| 2,875,986 | 3/1959 | Hulm | 165—166 |
| 3,198,248 | 8/1965 | Stack | 165—166 |
| 3,165,152 | 1/1965 | Jones | 165—166 |

ROBERT A. O'LEARY, Primary Examiner

T. W. STREULE, Assistant Examiner